US010677311B2

(12) United States Patent
Yue et al.

(10) Patent No.: US 10,677,311 B2
(45) Date of Patent: Jun. 9, 2020

(54) VIBRATION-DAMPING SUPPORT DEVICE

(71) Applicant: Zhuzhou Times New Material Technology Co., Ltd., Zhuzhou, Hunan (CN)

(72) Inventors: Tao Yue, Zhuzhou (CN); Weihui Hu, Zhuzhou (CN); Sheng Lin, Zhuzhou (CN); Zetao Su, Zhuzhou (CN); Pengfei Yuan, Zhuzhou (CN); Chao Yang, Zhuzhou (CN); Congcong Chen, Zhuzhou (CN); Ming Hou, Zhuzhou (CN); Hui Zeng, Zhuzhou (CN)

(73) Assignee: ZHUZHOU TIMES NEW MATERIAL TECHNOLOGY CO. LTD., Hunan (CN)

( * ) Notice: Subject to any disclaimer, the term of this patent is extended or adjusted under 35 U.S.C. 154(b) by 0 days.

(21) Appl. No.: 16/132,860

(22) Filed: Sep. 17, 2018

(65) Prior Publication Data
US 2019/0085932 A1    Mar. 21, 2019

(30) Foreign Application Priority Data

Sep. 20, 2017 (CN) .......................... 2017 1 0853726
Sep. 20, 2017 (CN) .......................... 2017 1 0855034

(51) Int. Cl.
*F16F 15/08*    (2006.01)
*F03D 7/02*    (2006.01)
(Continued)

(52) U.S. Cl.
CPC ............ *F16F 15/08* (2013.01); *F03D 7/0296* (2013.01); *F03D 15/00* (2016.05); *F16F 1/406* (2013.01);
(Continued)

(58) Field of Classification Search
CPC ......... F16F 15/08; F16F 1/406; F03D 7/0296; F03D 15/00; F03D 80/88; F05B 2260/964; F05B 2280/4004
(Continued)

(56) References Cited

U.S. PATENT DOCUMENTS 2,722,391 A * 11/1955 Krieghoff ............... F16F 1/406
248/556
5,765,322 A * 6/1998 Kubo ...................... E04H 9/022
248/634

(Continued)

FOREIGN PATENT DOCUMENTS

CN    103363005 A    10/2013
CN    103075461 B    9/2015
(Continued)

OTHER PUBLICATIONS

Search Report for corresponding European Application No. 18193169.2 dated Mar. 1, 2019.

*Primary Examiner* — Muhammad Ijaz
(74) *Attorney, Agent, or Firm* — Harness, Dickey & Pierce, P.L.C.

(57) ABSTRACT

Disclosed is a vibration-damping support device, including a housing, and a core shaft having one end passing through the housing to connect with a vibration source. The vibration-damping support device further includes two elastic members arranged within the housing and spaced apart from each other. Each elastic member includes an inner hole, so that it can be mounted on the core shaft. Each elastic member includes an elastic rubber body, and a plurality of metal plates that are embedded in the elastic rubber body and parallel to each other. The elastic rubber body extends beyond the metal plates in a radial direction. With this vibration-damping support device, a variable stiffness can be achieved.

7 Claims, 7 Drawing Sheets

(51) Int. Cl.
  *F03D 15/00* (2016.01)
  *F16F 1/40* (2006.01)
  *F03D 80/80* (2016.01)
(52) U.S. Cl.
  CPC ........ *F03D 80/88* (2016.05); *F05B 2260/964* (2013.01); *F05B 2280/4004* (2013.01)
(58) Field of Classification Search
  USPC ............... 248/556, 560, 562, 566; 52/167.7; 267/141.1
  See application file for complete search history.

(56) References Cited

U.S. PATENT DOCUMENTS

| | | | | |
|---|---|---|---|---|
| 9,933,036 B2* | 4/2018 | Chen | ............... | F16F 1/40 |
| 2004/0113338 A1* | 6/2004 | Wietharn | ............... | B60G 11/22 267/141.1 |
| 2009/0313917 A1* | 12/2009 | Takenoshita | ............ | E04H 9/022 52/167.7 |
| 2010/0007069 A1* | 1/2010 | Kawada | .................. | F16F 1/406 267/140.3 |
| 2012/0326366 A1* | 12/2012 | Kawada | .................... | F16F 1/40 267/140.5 |
| 2015/0217616 A1* | 8/2015 | Pei | ......................... | B60G 11/22 267/294 |
| 2016/0146283 A1* | 5/2016 | Sato | ....................... | F16F 15/04 267/141.1 |
| 2017/0276204 A1* | 9/2017 | Uno | ........................ | F16F 15/08 |
| 2019/0085932 A1* | 3/2019 | Yue | ......................... | F16F 15/08 |
| 2019/0128365 A1* | 5/2019 | Hattori | .................... | F16F 13/06 |

FOREIGN PATENT DOCUMENTS

| | | |
|---|---|---|
| EP | 1136719 A1 | 9/2001 |
| WO | WO-94/01695 A1 | 1/1994 |

* cited by examiner

VIBRATION-DAMPING SUPPORT DEVICE

CROSS-REFERENCE TO RELATED APPLICATIONS

The present application claims priority under 35 U.S.C. § 119 to Chinese Patent Application Nos. 201710855034.2 and 201710853726.3, both filed on Sep. 20, 2017, in the Chinese Patent & Trademark Office, the entire contents of each of which are hereby incorporated by reference.

FIELD OF THE INVENTION

The present invention relates to a vibration-damping support device, in particular a vibration-damping support device used for a gearbox of a wind turbine generator.

BACKGROUND OF THE INVENTION

As a clean and renewable energy source, wind energy has been widely recognized in various countries around the world. Wind generation is a procedure of conversion of the kinetic energy of wind into electricity. The use of wind power is environmentally friendly, and the amount of electricity that can be generated is enormous. With the development trend of large-scale and offshore wind power, megawatt-class high-power wind turbine generator will become dominant in the international market.

When blades of the wind turbine rotate and swing, the hub thereof will transmit a large force to various transmission components of the wind turbine generator, causing vibration of these components and generating noise. Therefore, the design of the vibration-damping system for each component is particularly important. In order to ensure stable operations of various components in the drive system of the wind turbine generator, and to reduce the vibration and noise generated by the system's operation as much as possible, it is necessary to adopt corresponding measures for vibration and noise reduction. Among others, the vibration reduction of the gearbox is particularly important, for which a proper vibration-damping support must be provided. In order to dampen the torsion moment transmitted from the main shaft to the gearbox, the vibration-damping support structure of the gearbox should provide a large load-bearing capacity when a large load is reversed.

CN103075461B discloses a vibration-damping support device for a gearbox of a wind turbine generator, the device being mounted on both sides of the gearbox of the wind turbine generator. An upper end of the vibration-damping support device is connected to an extension arm of the gear box of the wind turbine generator, and a lower end thereof is connected to a main frame. Similar to other vibration-damping support devices in the prior arts, the stiffness value of this vibration-damping support device is approximately a constant value, which is generally kept unchanged. However, in the case where the stiffness of an elastic support device is constant, when it is subjected to a large load, it can be concluded, based on related formula, that the deformation of the elastic support device will be particularly large. This large deformation will result in large oscillations of the components to be dampened, so that rigid collisions may occur at some locations. At the same time, the rubber parts are also easily damaged. Therefore, in the field, it is desirable that the stiffness value of the vibration-damping support device can be varied, so as to provide, for example, better vibration damping effect, and also protect the components to be dampened and the vibration-damping support device.

CN103363005A discloses a tapered vibration damper with adjustable rigidity, which includes a base, a stiffness adjusting device, an elastic member, and a height adjusting device. Among others, the stiffness adjusting device includes a slider, an adjusting bolt, a top block, and a spring. In this tapered vibration damper, the adjustment of stiffness is achieved essentially through an additional stiffness adjustment device. However, this stiffness adjusting device is complicated in structure, occupies a certain amount of installation space, and also increases the costs.

SUMMARY OF THE INVENTION

In view of the above problems, the present invention aims to provide a vibration-damping support device, which can achieve a variable adjustment on stiffness. The vibration-damping support device can be particularly used for reducing the vibration of a gearbox of a wind turbine generator.

According to the present invention, a vibration-damping support device is provided, including a housing, and a core shaft having one end passing through the housing to connect with a vibration source. The vibration-damping support device further includes two elastic members arranged within the housing and spaced apart from each other. Each elastic member includes an inner hole, with which it can be mounted on the core shaft. Each elastic member includes an elastic rubber body, and a plurality of metal plates that are embedded in the elastic rubber body and parallel to each other. The elastic rubber body extends beyond the metal plates in a radial direction.

In an embodiment, in a region of the elastic member toward the core shaft, the elastic rubber body extends beyond the metal plates in a radially inner direction.

In an embodiment, the inner hole of the elastic member is configured to have a variable diameter.

In an embodiment, the inner hole of the elastic member includes a first portion having a constant diameter and arranged at one end of the elastic member, and a second portion having a diameter that is gradually increased toward the other end thereof.

In an embodiment, the inner hole of the elastic member has a minimized diameter at an axial central position of the elastic member, and a diameter that is gradually increased in a direction from the axial central region to each axial end of the elastic member.

In an embodiment, the inner hole of the elastic member includes a first portion having a constant diameter at a middle region of the elastic member, and two second portions each extending from an end of the first portion to a corresponding axial end of the elastic member and having a diameter that is linearly increased toward the axial end of the elastic member.

In an embodiment, he inner hole of the elastic member includes a first portion arranged at a middle region of the elastic member, and two second portions each extending from an end of the first portion to a corresponding axial end of the elastic member and having a diameter that is linearly increased toward the axial end of the elastic member, wherein the first portion has an elliptic cross-sectional shape.

In an embodiment, in a region of the elastic member far away from the core shaft, the elastic rubber body extends beyond the metal plates in a radially outer direction.

In an embodiment, two outermost metal plates of said plurality of metal plates extend beyond other metal plates in the radially outer direction.

In an embodiment, the elastic rubber body has a constant outer diameter.

In an embodiment, the elastic rubber body has a minimized outer diameter at each of its axial ends, and a maximized outer diameter at it axially central position.

In an embodiment, the elastic rubber body has an outer profile of an arcuate shape.

In an embodiment, the elastic rubber body has an outer profile, including a central portion, which is arranged at a central region of the elastic rubber body and has a constant outer diameter, and two end portions that each have a linearly reduced outer diameter.

In an embodiment, a minimized distance between the elastic rubber body and the core shaft is in a range of 0 to 30 mm.

In an embodiment, the elastic members are each configured as a conical spring, and have opposite tapering directions. And the core shaft includes a shoulder, which has two inclined side faces for mounting the conical springs respectively.

In an embodiment, each metal plate has a generally Z-shaped structure, including a conical portion arranged at a middle region thereof and two flat portions at both ends thereof.

In an embodiment, the vibration source is a gearbox of a wind turbine generator.

BRIEF DESCRIPTION OF THE DRAWINGS

The present invention will be explained in more detail with reference to embodiments and accompanying drawings, in which.

DETAILED DESCRIPTION OF THE EMBODIMENTS

The present invention will be further described with reference to the accompanying drawings and specific embodiments. It should be noted that the directional terms, such as "upper", "lower", "right", "left", "outer", "inner" or the like, used in the context are all provided with reference to the relevant drawings. These terms are not intended to define the absolute positions of any components associated, but can be changed based on actual condition.

Figure 1:
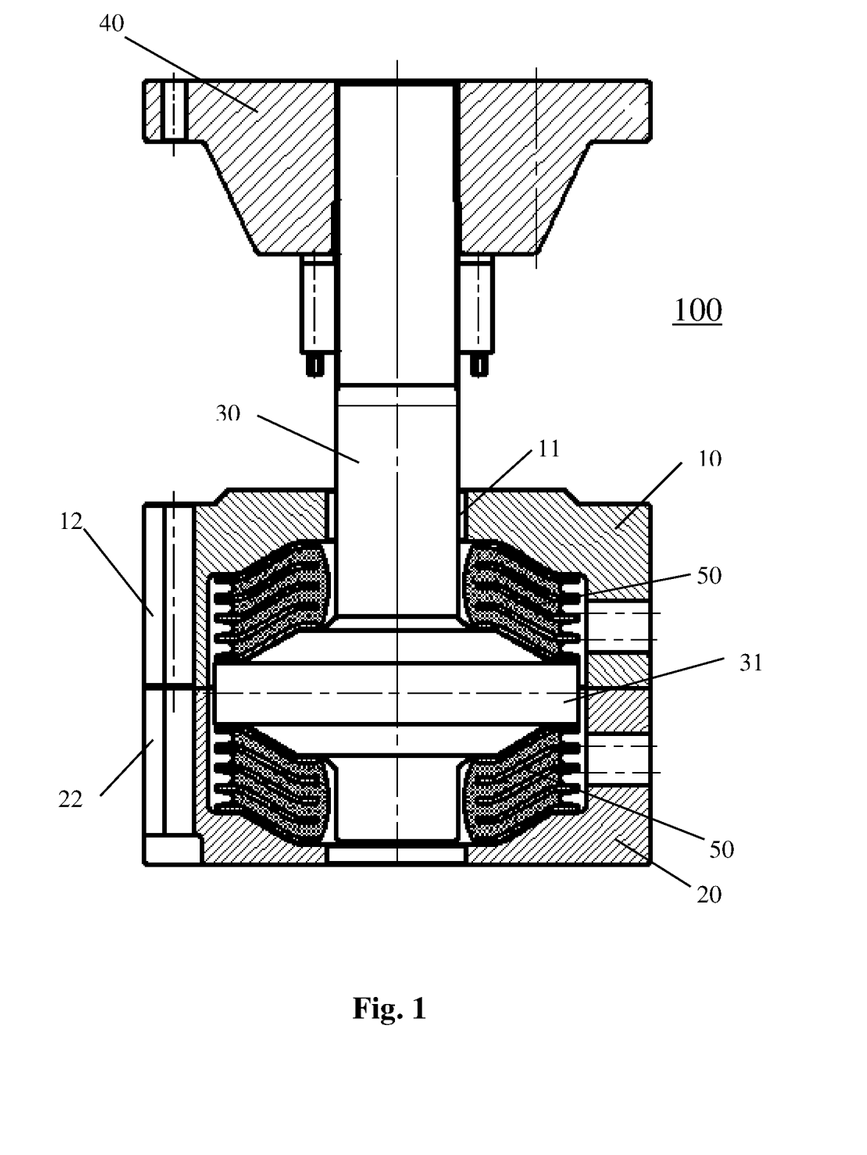
FIG. 1 schematically shows the structure of a vibration-damping support device according to the present invention.

FIG. 1 schematically shows the whole structure of a vibration-damping support device 100 according to the present invention. The vibration-damping support device 100 can be particularly used for vibration reduction for a gearbox of a wind turbine generator. As shown in FIG. 1, the vibration-damping support device 100 includes a housing, which, in the embodiment as shown, consists of an upper housing 10 and a lower housing 20. The upper housing 10 and the lower housing 20 are both provided with a plurality of semi-open rounded grooves 12 and 22, which are arranged at the outer peripheral edges of the upper housing 10 and the lower housing 20, respectively, in a round. The rounded grooves 12 and 22 are arranged to align with each other, so that bolts (not shown) can pass through respective rounded grooves 12 and 22 to connect the upper housing 10 with the lower housing 20 together. In this manner, the upper housing 10 and the lower housing 20 collectively define a complete, closed space. It could be readily understood by one skilled in the art that a one-piece housing also falls within the scope of protection of the present invention.

The vibration-damping support device 100 further includes a core shaft 30, which passes through an opening 11 arranged at a top part of the upper housing 10 to protrude outwardly. An upper end of the core shaft 30 is connected with a ring flange 40, via which the core shaft 30 is experienced with a torsion moment from a vibration source, such as the gearbox of the wind turbine generator. The core shaft 30 is provided with a shoulder 31 in a portion located within the housing, and two incline surfaces are formed at both sides of the shoulder 31.

Two elastic members 50 are arranged in the space defined by the upper housing 10 and the lower housing 20, one above another. The elastic members 50 are both configured as tapered springs, the tapering directions thereof being opposite to each other. Specifically, the upper elastic member 50 is tapered in size upwardly toward the axially outer direction of the upper housing 10 while the lower elastic member 50 is tapered in size downwardly toward the axially outer direction of the lower housing 20, and the two elastic members 50 are arranged on said two incline surfaces formed at both sides of the shoulder 31. Each of the two elastic members 50 is formed by an elastic rubber body embedded with a metal skeleton therein. In the following, reference will be made to the upper elastic member 50 for illustration.

Figure 2:
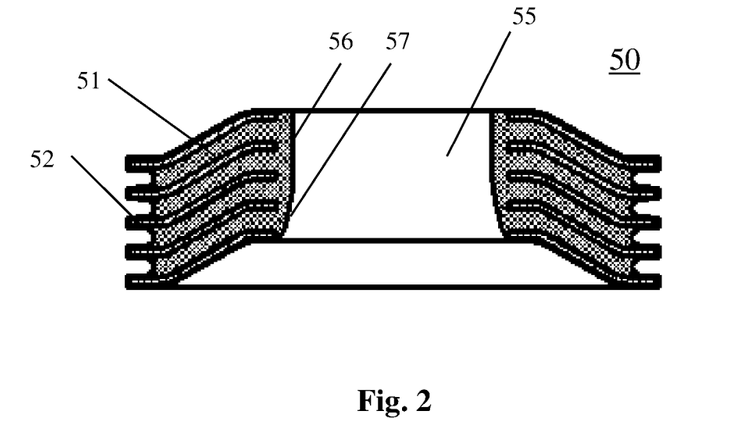
FIG. 2 schematically shows the structure of an elastic member of a first embodiment of the vibration-damping support device according to the present invention.

FIG. 2 shows the elastic member 50 of the vibration-damping support device 100 according to a first embodiment of the present invention. The elastic member 50 includes an elastic rubber body 51, which is generally tapered in shape, and a plurality of metal plates 52 embedded in the elastic rubber body 51 as the skeleton. These metal plates 52 are preferably arranged parallel to each other. The elastic member 50 further has an inner hole 55, through which the core shaft 30 passes. In other words, the elastic member 50 is mounted on the core shaft 30 by means of the inner hole 55. It should be understood that although the term "elastic rubber body" is used here for convenience, elastic members made of other materials can be also suitably used in the present invention. Moreover, the specific structure and material for the metal plate can be readily selected by one skilled in the art based on actual needs.

In the prior arts, the elastic rubber body 51 is configured to be located within the metal plates 52 in a radial direction. For example, as shown in FIG. 2, in a radially outer area, i.e., an area far away from the inner hole 55, of the elastic rubber body 51, the elastic rubber body 51 is arranged inside the metal plates 52; that is, the elastic rubber body 51 is configured to retract inwardly in the radial direction with respect to the metal plates 52. In other words, in the radially outer area of the elastic rubber body 51, the metal plates 52 protrude outwardly in the radial direction with respect to the elastic rubber body 51. Similarly, in the prior arts, in a radially inner area, i.e., an area adjacent to the inner hole 55, of the elastic rubber body 51, the elastic rubber body 51 is also arranged inside the metal plates 52 (not shown in FIG. 2); that is, the elastic rubber body 51 is configured to retract outwardly in the radial direction with respect to the metal plates 52. In other words, in the radially inner area of the elastic rubber body 51, the metal plates 52 protrude inwardly in the radial direction with respect to the elastic rubber body 51. Accordingly, in the prior arts, the inner hole 55 of the elastic member 50 has a generally constant inner diameter which is defined by the metal plates 52.

According to the present invention, in the radially outer area, i.e., the area far away from the inner hole 55, of the elastic rubber body 51, the elastic rubber body 51 is still arranged inside the metal plates 52; that is, the elastic rubber body 51 is configured to retract inwardly in the radial direction with respect to the metal plates 52. However, in the radially inner area, i.e., the area adjacent to the inner hole 55, of the elastic rubber body 51, the elastic rubber body 51 is located beyond the metal plates 52 (as shown in FIG. 2); that is, the elastic rubber body 51 extends beyond the metal plates 52 in the radial direction toward the inner hole 55. That means, the elastic rubber body 51 is configured to bulge inwardly in the radial direction with respect to the metal plates 52. In other words, the elastic rubber body 51 is configured to be arranged nearer to the core shaft 30 than the metal plates 52. Therefore, according to the present invention, the inner hole 55 of the elastic member 50 has an inner diameter which is defined by the inner side of the elastic rubber body 51. The inner diameter is preferably variable.

According to one embodiment of the present invention, the smallest distance between the elastic rubber body 51 and the core shaft 30 is set in a range of 0-30 mm. Preferably, the smallest distance between the elastic rubber body 51 and the core shaft 30 is set in a range of 0-10 mm.

Figure 3:
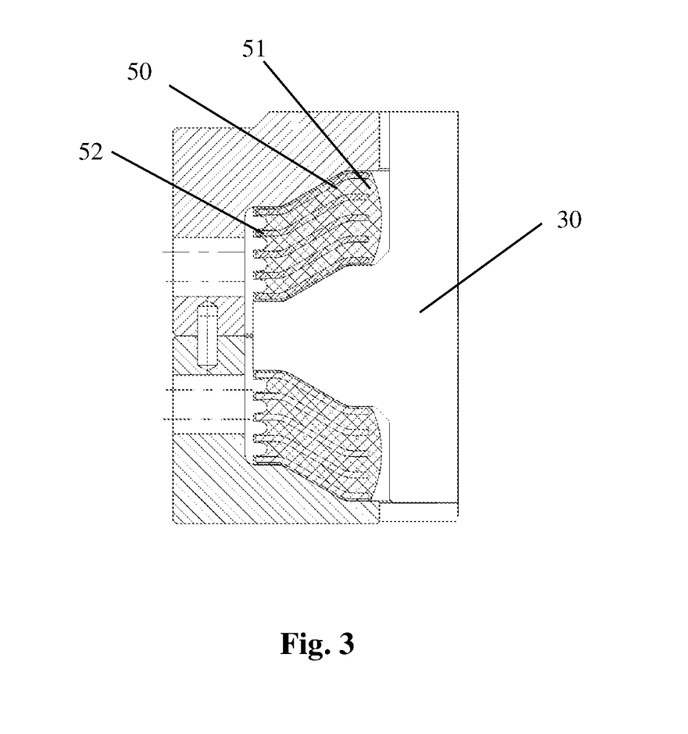
FIG. 3 schematically shows the state of the elastic member according to the first embodiment before a core shaft is exerted with a force.
Figure 4:
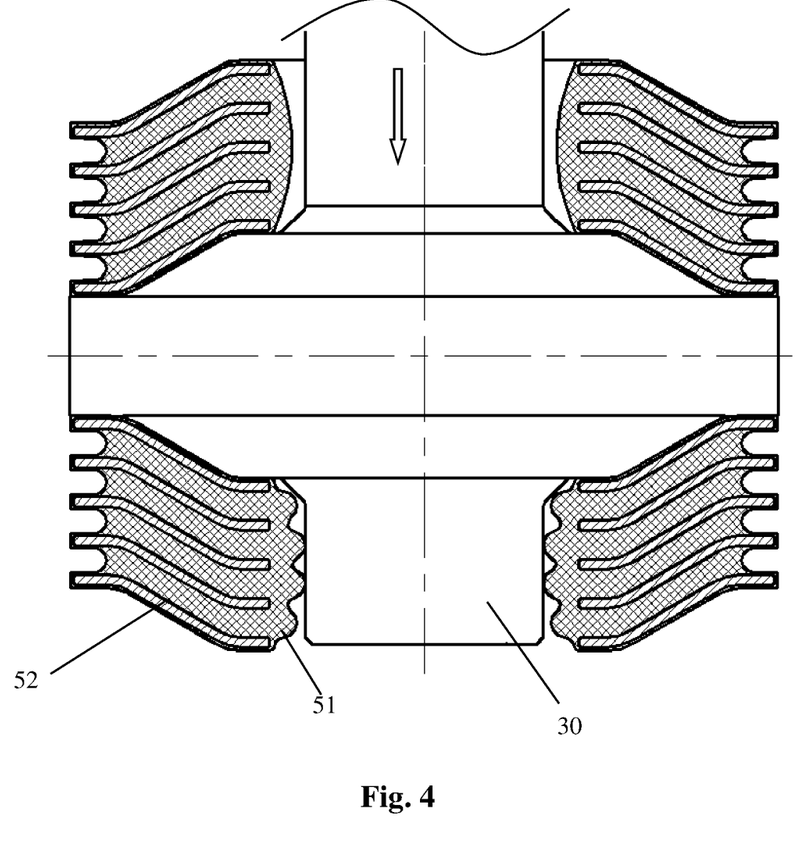
FIG. 4 schematically shows the state of the elastic member according to the first embodiment after the core shaft is exerted with the force.

FIGS. 3 and 4 schematically show the states of the elastic member 50 of the vibration-damping support device 100 according to the first embodiment of the present invention before and after the core shaft 30 is exerted with a force to experience a movement. As shown in FIG. 3, before the core shaft 30 is exerted with a force, the two elastic members 50 are mounted on the core shaft 30, and the elastic rubber bodies 51 of the two elastic members 50 extend beyond the metal plates 52 in the areas thereof adjacent to the core shaft 30, thus each forming a slightly swelling shape. As shown in FIG. 4, when the core shaft 30 is exerted with a force, such as a downward force (as shown by the arrow of FIG. 4), the lower elastic member 50 will withstand a load, so that the elastic rubber body 51 of the lower elastic member 50 will bulge toward the core shaft 30 more significantly. When the lower elastic member 50 withstands an extreme load, the bulged portion of the elastic rubber body 51 thereof will start to contact with the core shaft 30, so that the core shaft 30 will restrict the deformation of the rubber. Under such circumstances, the stiffness of the elastic rubber body 51 will be increased gradually. Moreover, as the load is increasing, the amplitude of the stiffness increase will be larger.

Similarly, it is readily understood that when the core shaft 30 is exerted with an upward force, the upper elastic member 50 will withstand a load, so that the elastic rubber body 51 of the upper elastic member 50 will bulge toward the core shaft 30 more significantly. When the upper elastic member 50 withstands an extreme load, the bulged portion of the elastic rubber body 51 thereof will start to contact with the core shaft 30, so that the core shaft 30 will restrict the deformation of the rubber. Under such circumstances, the stiffness of the elastic rubber body 51 of the upper elastic member 50 will be increased gradually. Moreover, as the load is increasing, the amplitude of the stiffness increase will be larger.

Accordingly, when the core shaft 30 is exerted with a force to move up and down, the elastic rubber body 51 of the upper or lower elastic member 50 will bulge inwardly to contact with the core shaft 30. Thus the deformation of the elastic rubber body will be restricted by the core shaft 30, causing the stiffness thereof being changed significantly. In this way, the vibration-damping support device 100 will be endowed with a variable stiffness. Compared with the prior arts, the vibration-damping support device 100 according to the present invention is dispensed with an additional stiffness adjusting device, and in the meantime, has a simple structure and saves the costs and precious mounting space.

The vibration-damping support device 100 according to the present invention will have a relatively low stiffness under normal working load, thus ensuring its vibration-damping capability. By contrast, when the vibration-damping support device 100 suffers with an abnormally large load, the stiffness of the vibration-damping support device 100 will be increased sharply, thus achieving the purposes of reducing the dynamic deformation and ensuring safe operation of the component to be dampened.

According to the present invention, the inner hole 55 of the elastic member 50 is defined by the inner side of the elastic rubber body 51. In the embodiment shown in FIG. 2, the inner hole 55 of the elastic member 50 includes a first portion 56 which is located at one end and has a constant diameter, and a second portion 57 having a diameter which is increased gradually along a direction toward the other end. The second portion 57 having a gradually increased diameter is preferably arranged at a side of the elastic member 50 having a larger diameter. The diameter can be gradually increased in a curved manner, or in a linear manner.

According to the embodiment as shown in FIG. 2, when the elastic rubber body 51 is deformed to bulge out, the linear, first portion 56 will contact with the core shaft 30 as a whole simultaneously. When the component to be dampened suffers a large load, rigid collision would be generated at some portions thereof, which is particularly advantageous for the embodiment as shown in FIG. 2. In particular, when the load is increased to a certain value, the stiffness of the vibration-damping support device will experience a sudden change; that is, the stiffness will be increased many times instantaneously. Therefore, the displacement of the vibration-damping support device will be kept constant, generating an effect similar to "emergency braking". This can advantageously protect the component to be dampened and the vibration-damping support device.

According to the present invention, the metal plate 52 of the elastic member 50 is configured to have a Z-shaped structure, as shown in FIG. 2. Specifically, the metal plate 52 of the Z-shaped structure includes a conical portion arranged in a middle part thereof, and two flat portions each arranged at an end thereof. The elastic member 50 having the Z-shaped metal plates 52 is similar to the elastic member having ordinary conical plates, both possessing a certain lateral stiffness. However, the former presents improved properties on rubber stress and metal stress than the latter. The ordinary conical plate has a smaller opening formed at each end thereof, which would negatively influence on the rubber deformation under load. In addition, the internal stress generated when the rubber is deformed would easily render the metal plates arranged at both ends of the elastic member in fatigue. By contrast, when several identical Z-shaped metal plates are stacked together, a larger opening could be formed at each end of the elastic member 50. This would beneficial for the deformation of rubber and the release of stress under load.

Figure 5:
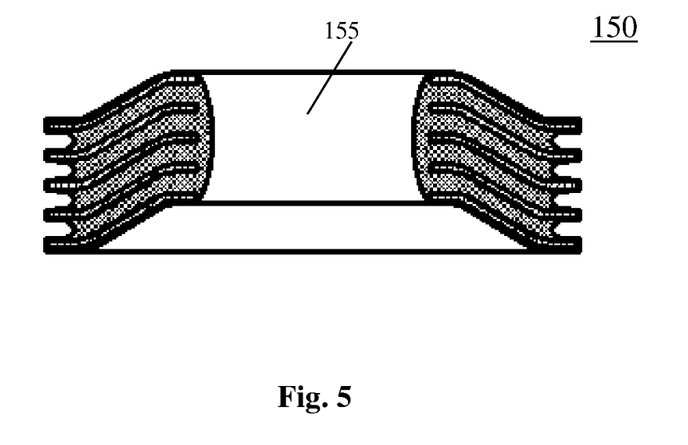
FIG. 5 schematically shows the structure of an elastic member of a second embodiment of the vibration-damping support device according to the present invention.

FIG. 5 shows a second embodiment of the elastic member according to the present invention. In this embodiment, the inner hole 155 of the elastic member 150 has a minimized diameter at an axial central position thereof, and a gradually increased diameter along a direction toward each axial end thereof. That is, the inner hole 155 of the elastic member 150 has an arcuate cross-sectional shape.

According to the embodiment as shown in FIG. 5, when the elastic rubber body 51 is deformed to bulge out, the linear, the elastic rubber body 51 will firstly contact with the core shaft 30 at its axial central position, and then gradually contact with the core shaft 30 along the directions from the central position to both ends. This is different from the simultaneous contact in the embodiment of FIG. 5. According to the embodiment as shown in FIG. 5, when the load is heavy, the stiffness of the vibration-damping support device will be changed gradually. Therefore, in this case the vibration-damping support device will still present a certain vibration-damping property, generating an effect similar to "point braking". This can also advantageously protect the component to be dampened and the vibration-damping support device.

Figure 6:
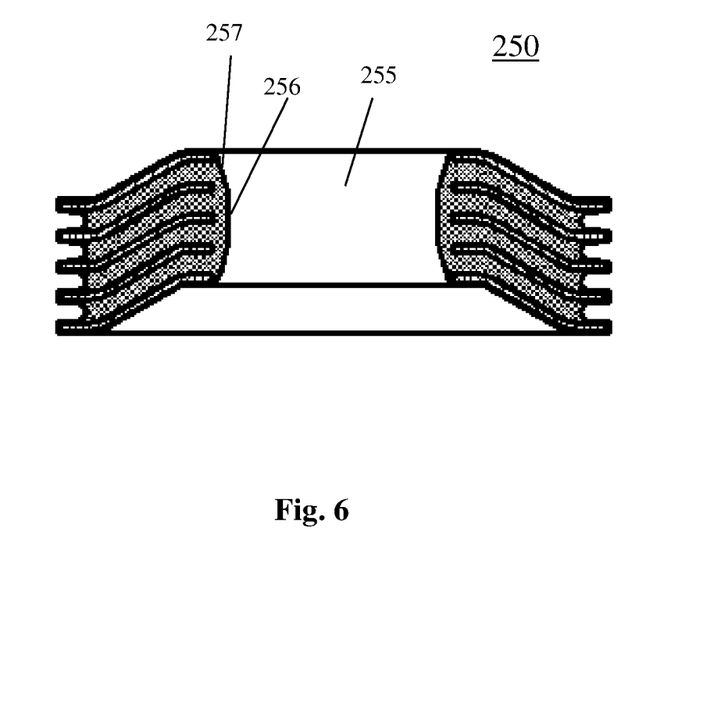
FIG. 6 schematically shows the structure of an elastic member of a third embodiment of the vibration-damping support device according to the present invention.

FIG. 6 shows a third embodiment of the elastic member according to the present invention. In this embodiment, the inner hole 255 of the elastic member 250 has a first portion 256 having a constant diameter at its axial central region, and two second portions 257 each extending from a corresponding end of the first portion 256 and having a linearly increased diameter along a direction toward an axial end of the elastic member 250. Therefore, the first portion 256 is shaped as a cylinder, while each of the second portions 257 is shaped as a frustum. That is, the inner hole 155 of the elastic member 150 has a cross-sectional shape of a combination of several linear segments. The embodiment according to FIG. 6 can achieve similar effect as that according to FIG. 2.

Figure 7:
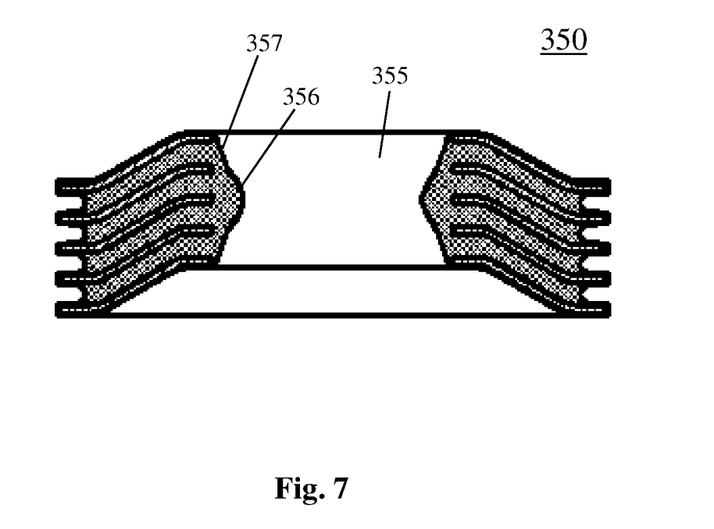
FIG. 7 schematically shows the structure of an elastic member of a fourth embodiment of the vibration-damping support device according to the present invention.

FIG. 7 shows a fourth embodiment of the elastic member according to the present invention. In this embodiment, the inner hole 355 of the elastic member 350 has a first portion 356 arranged at its axial central region, and two second portions 357 each extending from a corresponding end of the first portion 356 and having a linearly increased diameter along a direction toward an axial end of the elastic member 350. The first portion 356 of the inner hole 355 of the elastic member 350 has a cross-sectional shape of an elliptic surface, while each of the second portions 357 has a cross-sectional shape of a frustum. The embodiment according to FIG. 7 can achieve similar effect as that according to FIG. 5.

Through selecting the shape of the inner hole of the elastic member according to FIGS. 2 and 5-7, the elastic member can have different changing trends of stiffness, thus can satisfying different requirements for different applications. The specific structure to be adopted can be dependent on the balance between the requirement on the displacement and that on the vibration dampening property for the wind turbine generator. It can be designed by one skilled in the art based on actual needs.

Figure 8:
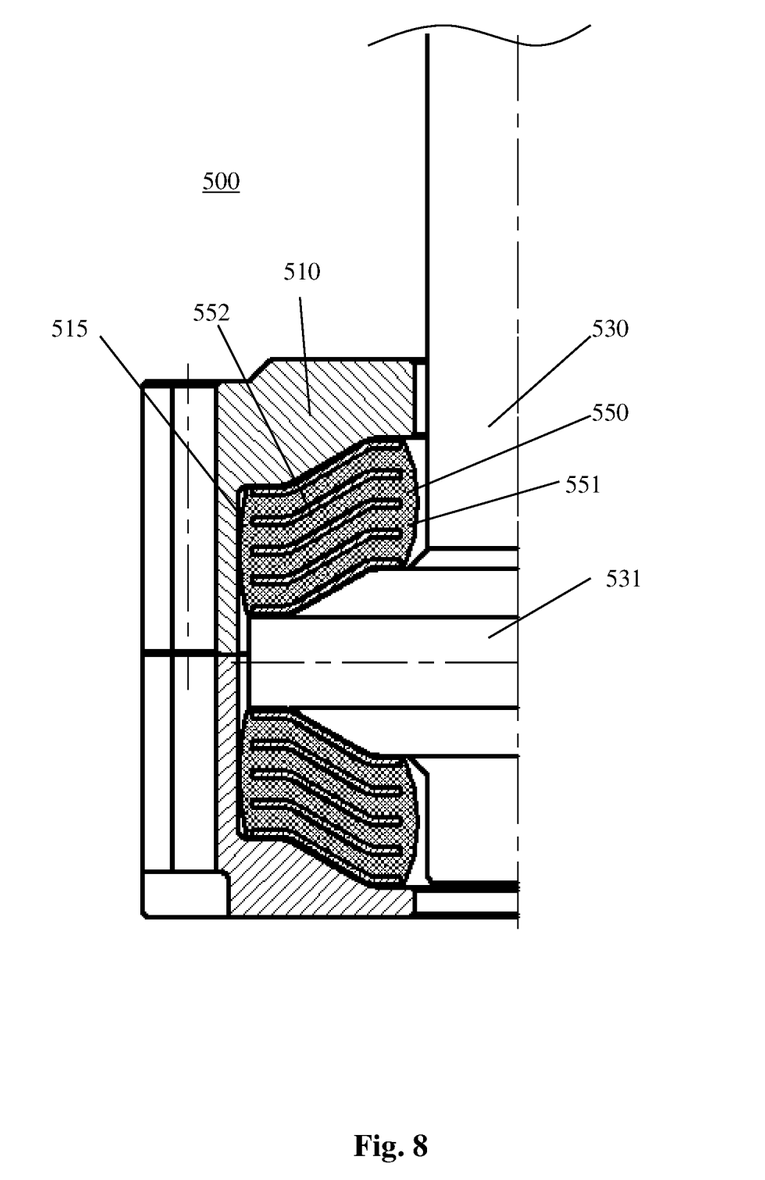
FIG. 8 schematically shows the structure of an elastic member of a fifth embodiment of the vibration-damping support device according to the present invention.

FIG. 8 schematically shows the structure of a vibration-damping support device 500 according to a fifth embodiment of the present invention. According to this embodiment, in the radially outer area, i.e., the area far away from the core shaft 530, of the elastic rubber body 551 of the elastic member 550 of the vibration-damping support device 500, the elastic rubber body 551 is located beyond the metal plates 552; that is, the elastic rubber body 551 is configured to extend outwardly in the radial direction with respect to the metal plates 552. That means, the elastic rubber body 551 is configured to bulge outwardly in the radial direction. In other words, the elastic rubber body 551 is configured to be arranged nearer to the inner wall 515 of the housing 510 than the metal plates 52. Therefore, according to this embodiment, the outer profile of the elastic member 550 has an outer diameter which is defined by the outer side of the elastic rubber body 551. The outer diameter can be constant or variable.

According to one example of the present invention, the smallest distance between the elastic rubber body 551 and the inner wall 515 of the housing 510 is set in a range of 0-30 mm. Preferably, the smallest distance between the elastic rubber body 551 and the inner wall 515 of the housing 510 is set in a range of 0-10 mm.

Figure 9:
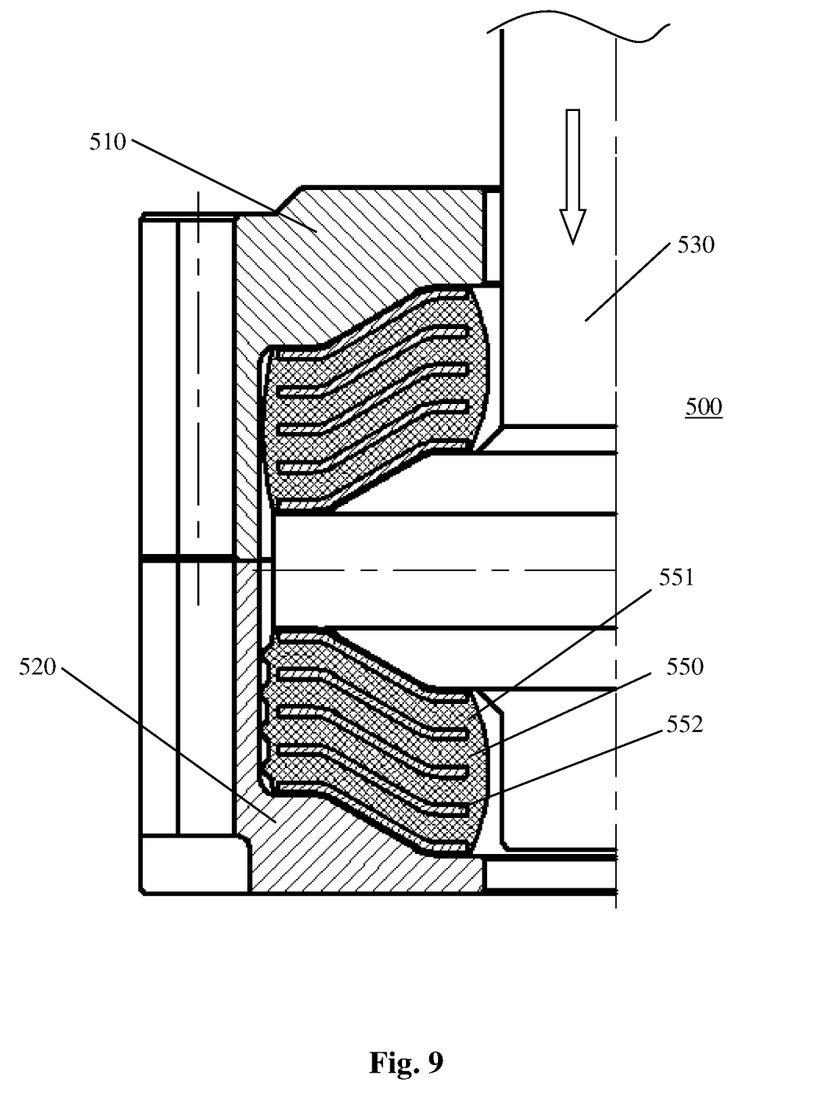
FIG. 9 schematically shows the state of the elastic member according to the fifth embodiment after the core shaft is exerted with the force.

FIG. 9 schematically show the state of the elastic member 550 of the vibration-damping support device 500 according to the fifth embodiment of the present invention after the core shaft 530 is exerted with a force to experience a movement. As shown in FIG. 9, when the core shaft 530 is exerted with a force, such as a downward force (as shown by the arrow of FIG. 9), the lower elastic member 550 will withstand a load, so that the elastic rubber body 551 of the lower elastic member 550 will bulge toward the lower housing more significantly. When the lower elastic member 550 withstands an extreme load, the bulged portion of the elastic rubber body 551 thereof will start to contact with the lower housing, so that the lower housing will restrict the deformation of the rubber. Under such circumstances, the stiffness of the elastic rubber body 551 will be increased gradually. Moreover, as the load is increasing, the amplitude of the stiffness increase will be larger.

Similarly, it is readily understood that when the core shaft 530 is exerted with an upward force, the upper elastic member 550 will withstand a load, so that the elastic rubber body 551 of the upper elastic member 550 will bulge toward the upper housing more significantly. When the upper elastic member 550 withstands an extreme load, the bulged portion of the elastic rubber body 551 thereof will start to contact with the upper housing, so that the upper housing will restrict the deformation of the rubber. Under such circumstances, the stiffness of the elastic rubber body 551 of the upper elastic member 550 will be increased gradually. Moreover, as the load is increasing, the amplitude of the stiffness increase will be larger.

Accordingly, when the core shaft 530 is exerted with a force to move up and down, the elastic rubber body 551 of the upper or lower elastic member 550 will bulge inwardly to contact with the upper housing or the lower housing of the housing 510. Thus the deformation of the elastic rubber body will be restricted by the housing 510, causing the stiffness thereof being changed significantly. In this way, the vibration-damping support device 500 will be endowed with a variable stiffness. Compared with the prior arts, the vibration-damping support device 500 according to the present invention is dispensed with an additional stiffness adjusting device, and in the meantime, has a simple structure and saves the costs and precious mounting space.

The vibration-damping support device 500 according to the present invention will have a relatively low stiffness under normal working load, thus ensuring its vibration-damping capability. By contrast, when the vibration-damping support device 500 suffers with an abnormally large load, the stiffness of the vibration-damping support device 100 will be increased sharply, thus achieving the purposes of reducing the dynamic deformation and ensuring safe operation of the component to be dampened.

Obviously, as an addition, the radially inner region of the elastic rubber body 551 according to the fifth embodiment can have a similar structure as any one of those according to the first to the fourth embodiments.

Figure 10:
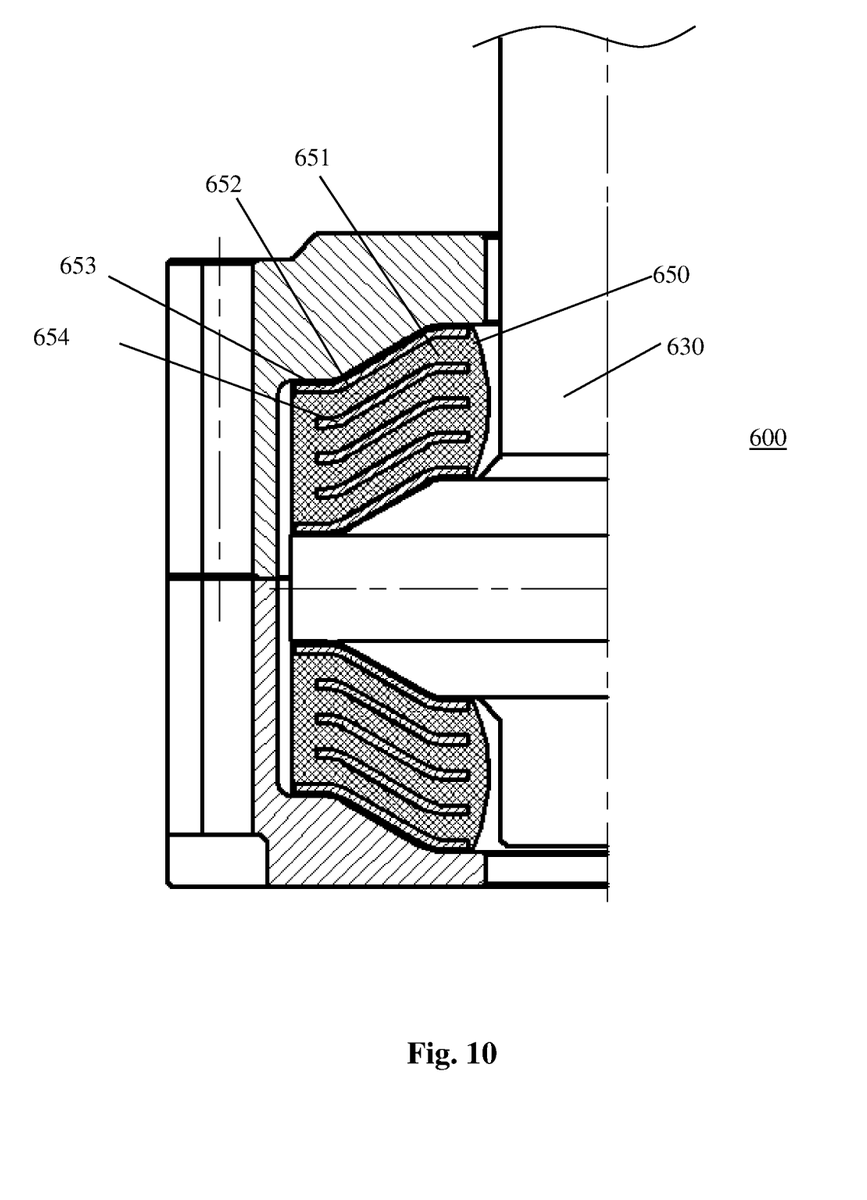
FIG. 10 schematically shows the structure of an elastic member of a sixth embodiment of the vibration-damping support device according to the present invention.

FIG. 10 schematically shows the structure of a vibration-damping support device 600 according to a sixth embodiment of the present invention. In this embodiment, the elastic member 650 includes a total of five metal plates 652, consisting of two outermost metal plates 653 (i.e., the uppermost one and the lowermost one) and three middle metal plates 654.

According to this embodiment, the outer profile of the elastic member 650 has an approximately constant outer diameter, which is defined by the elastic rubber body 651 and slightly larger than the diameter of said two outermost metal plates 653. Therefore, said two outermost metal plates 653 of the elastic member 650 extend beyond the middle metal plates 654 in an outer radially direction. That means, the middle metal plates 654 are each slightly shorter than said two outermost metal plates 653.

According to the embodiment as shown in FIG. 10, when the elastic rubber body 651 is deformed to bulge out, the linear, it will contact with the core shaft 630 as a whole simultaneously. When the component to be dampened suffers a large load, rigid collision would be generated at some portions thereof, which is particularly advantageous. In particular, when the load is increased to a certain value, the stiffness of the vibration-damping support device will experience a sudden change; that is, the stiffness will be increased many times instantaneously. Therefore, the displacement of the vibration-damping support device will be kept constant, generating an effect similar to "emergency braking". This can advantageously protect the component to be dampened and the vibration-damping support device.

According to an embodiment not shown, the outer profile of the elastic rubber body can be configured to consist of three linear segments. That is to say, the outer profile of the elastic rubber body includes a central portion which is located at the axially central region of the elastic rubber body and has a constant outer diameter, and two end portions that are located at both ends and each have an outer diameter gradually reduced. It can also achieve similar technical advantages.

The vibration-damping support device according to the present invention can be particularly used for reducing the vibration of a gearbox of a wind turbine generator. However, it can be readily understood that the vibration-damping support device according to the present invention can be also used in other applications which need vibration reduction.

Although the present invention has been described with reference to preferred embodiments, various modifications and variants to the present invention may be made by anyone skilled in the art, without departing from the scope and spirit of the present invention. In particular, as long as there is no structural conflict, the respective technical features mentioned in various embodiments may be combined with one another in any manner. The present invention is not limited to the specific embodiments disclosed herein, but rather includes all the technical solutions falling within the scope of the claims.

The invention claimed is:

1. A vibration-damping support device, including:
   a housing;
   a core shaft having one end passing through the housing to connect with a vibration source; and
   two elastic members arranged within the housing and spaced apart from each other, each elastic member including an inner hole with which it can be mounted on the core shaft, wherein each elastic member includes an elastic rubber body, and a plurality of metal plates that are embedded in the elastic rubber body and parallel to each other,
   wherein, for each elastic member,
      the elastic rubber body included in the elastic member extends beyond the metal plates included in the elastic member in a radial direction,
      in a region of the elastic member toward the core shaft, the elastic rubber body included in the elastic member extends beyond the metal plates included in the elastic member in a radially inner direction,
      the inner hole of the elastic member is configured to have a variable diameter, and
      the inner hole of the elastic member has a minimized diameter at an axial central position of the elastic member, and a diameter that is gradually increased in a direction from the axial central position to each axial end of the elastic member.

2. The vibration-damping support device according to claim 1, wherein, for each elastic member,
   the inner hole of the elastic member includes a first portion having a constant diameter at a middle region of the elastic member, and two second portions each extending from an end of the first portion to the respective axial end of the elastic member and having the variable diameter that is linearly increased toward the respective axial end of the elastic member.

3. The vibration-damping support device according to claim 1, wherein, for each elastic member,
   the inner hole of the elastic member includes a first portion arranged at a middle region of the elastic member, and two second portions each extending from an end of the first portion to the respective axial end of the elastic member and having the variable diameter that is linearly increased toward the axial end of the elastic member, wherein the first portion has an elliptic cross-sectional shape.

4. The vibration-damping support device according to claim 1, wherein a minimized distance between the elastic rubber body and the core shaft is in a range of 0 to 30 mm.

5. The vibration-damping support device according to claim 1, wherein the elastic members are each configured as a conical spring, and have opposite tapering directions; and
   the core shaft includes a shoulder, which has two inclined side faces for mounting the conical springs respectively.

6. The vibration-damping support device according to claim 1, wherein each metal plate has a generally Z-shaped structure, including a conical portion arranged at a middle region thereof and two flat portions at both ends thereof.

7. The vibration-damping support device according to claim 1, wherein the vibration source is a gearbox of a wind turbine generator.

\* \* \* \* \*